(12) United States Patent
Osime

(10) Patent No.: US 6,390,561 B1
(45) Date of Patent: May 21, 2002

(54) ADAPTABLE RIDER RESTRAINT SYSTEM

(76) Inventor: Joshua Oghenogieme Osime, P.O. Box 656, Alief, TX (US) 77411-0656

( * ) Notice: Subject to any disclaimer, the term of this patent is extended or adjusted under 35 U.S.C. 154(b) by 0 days.

(21) Appl. No.: 09/535,557

(22) Filed: Mar. 27, 2000

(51) Int. Cl.[7] .............................................. A47C 31/00
(52) U.S. Cl. ...................... 297/468; 297/484; 297/467; 297/474; 280/290
(58) Field of Search .................. 297/468, 467, 297/469, 474, 478, 480, 481, 484; 280/801.1, 808, 304.4, 290, 806; 180/219

(56) References Cited

U.S. PATENT DOCUMENTS

| 579,002 A | * | 3/1897 | Merrill ..................... 280/290 X |
| 3,371,942 A | | 3/1968 | Buck et al. |
| 3,940,166 A | | 2/1976 | Smithea |
| 4,416,465 A | * | 11/1983 | Winiecki ..................... 280/290 |
| 4,738,413 A | | 4/1988 | Spinosa et al. |
| 4,799,709 A | * | 1/1989 | Francois ................. 280/290 X |
| 4,981,306 A | * | 1/1991 | Young ......................... 280/290 |
| 5,676,398 A | | 10/1997 | Nurtsch |

FOREIGN PATENT DOCUMENTS

| AU | 79402 | * | 9/1976 | ................. 297/484 |
| FR | 472616 | * | 8/1914 | ................. 280/290 |
| FR | 2630393 | * | 10/1989 | ................. 280/290 |

* cited by examiner

Primary Examiner—Laurie K. Cranmer

(57) ABSTRACT

A restraint system of belts and buckles designed to protect every rider and passenger occupying conventional type seats in open vehicles, such as motorcycles, from injuries sustainable from flying off such vehicles in the event of a head-on collision, sudden stop or other such type circumstance. A restraint system also unique in being amenable to installation in such existing vehicles.

6 Claims, 4 Drawing Sheets

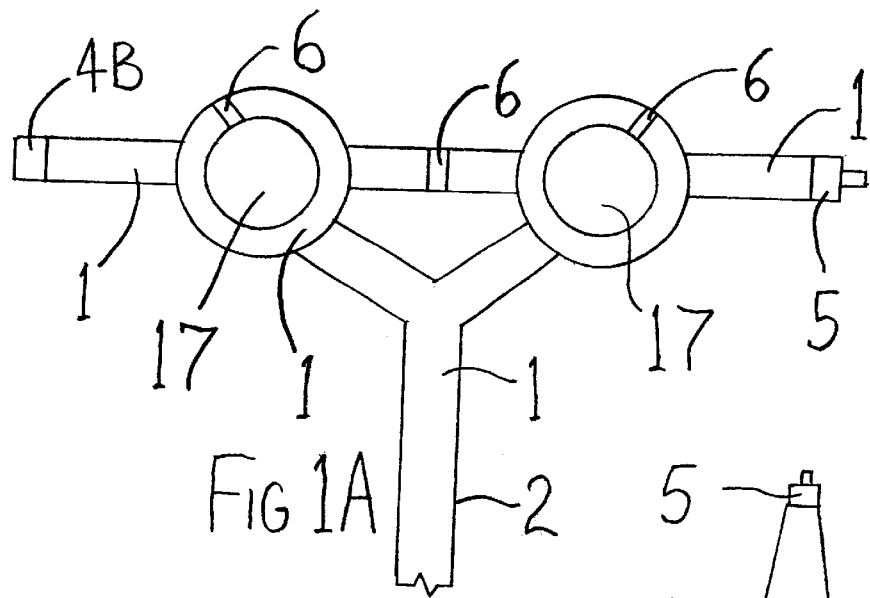
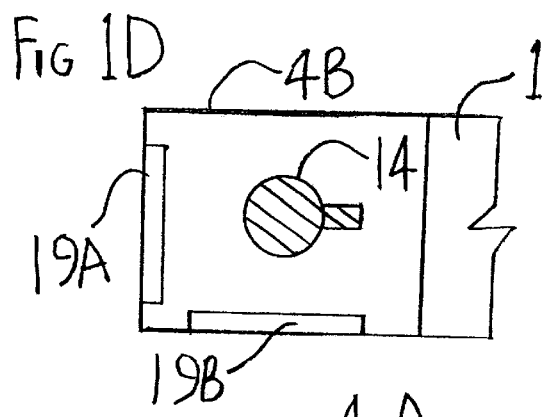
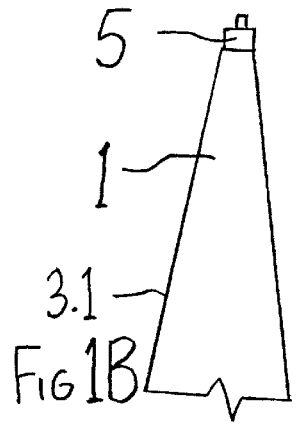
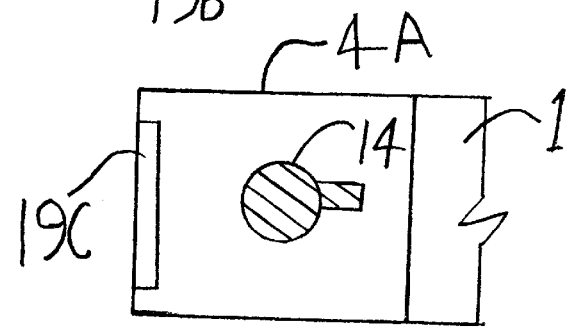
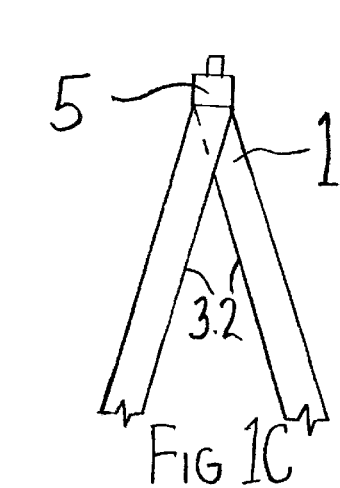

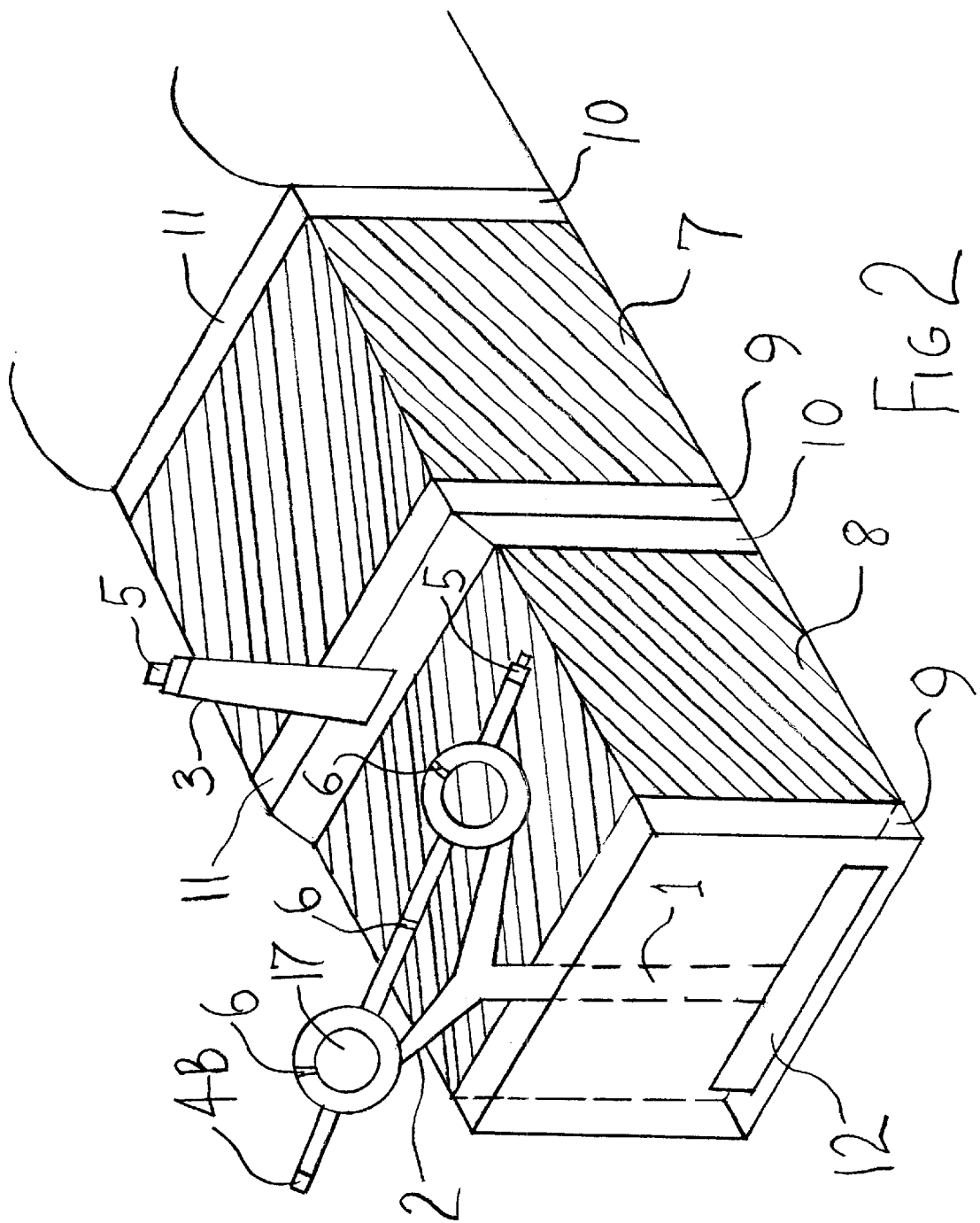

ADAPTABLE RIDER RESTRAINT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention relates to the field of belt restraint systems widely used in securing vehicle occupants therein but more specifically to the procurement of greater safety for open vehicle type users.

A number of relevant restraint devices have been patented. U.S. Pat. No. 3,371,942 discloses an automobile seat belt incorporating a combination of lap belt and upper torso restraint while U.S. Pat. No. 4,738,413 discloses a more complex harness restraint system for a high performance vehicle, including an aircraft, which distributes inertia forces across a plurality of harnesses around the occupant of the vehicle. Both designs are however inapplicable to vehicles requiring astride seating and having seats lacking in a back-rest portion, as most open vehicles contemplated here do (for example, motorcycles). U.S. Pat. No. 3,940,166 discloses an auxiliary retention belt and support cushion for securing the motorcycle rider to the motorcycle operator. It provides no safety restraint however for the latter (who secures his safety by his firm grip on the motorcycle)and is geared exclusively at the passenger. U.S. Pat. No. 5,676,398 discloses a shoulder and lap belt safety device attached to a form fitted seat for two wheeled vehicles. According to its spirit and letter, it is inoperable without its special "back-rest" seat format. It is further, and thus, not amenable to installation in most existing two wheel type or other open vehicles with conventional seats (astride seating with no "back-rest" portion). It also limits the two-wheel vehicle occupant to one.

BRIEF SUMMARY OF THE INVENTION

The Rider Restraint System (RRS) is a revolutionary restraint system intended to prevent open vehicle operators AND passengers from being thrown off their vehicles in the event of a sudden stop or head-on collision. Understanding that a majority of open vehicle accidents involve a frontal impact, it is believed that the RRS, acting in conjunction with other existing devices like the safety helmet, will serve to save countless lives in America and around the world, by minimizing the fatal head and body injuries sustained by multitudes when accidentally catapulted from their open vehicles.

By means of retractable belts with matching buckle ends that extend from compartments with closure and covering means, said compartments being mainly situated before and behind both operator and passenger seats, such persons are secured to the open vehicle. Freedom of movement is facilitated as the belts are equipped with spring-loaded inertia reels/locks (widely used today in automobile seat belts) or other similar devices, that deny further belt extension in the event of a sudden deceleration as in a sudden stop or head-on collision.

While desirable for affixation in all new open vehicle production, this invention lends itself to installation in older open vehicles such as motorcycles. By replacing existing conventional seats on a motorcycle with slightly shorter ones (lengthwise), the few inches needed to position the belt compartments is immediately created. This invention is thus a ready "upgrade" to the safety status of virtually any open vehicle. It is also, unlike its predecessors, less complex and inexpensive, requiring no special vehicle or seat format to operate in, and is installable in as many seats as the open vehicle may have.

BRIEF DESCRIPTION OF DRAWINGS

FIG. 1A is a plan view of one of the preferred embodiments of this invention (in conjunction with FIG. 1B and 1C). FIG. 1B and 1C are alternate constructs of the accompanying piece to the FIG. 1A embodiment. FIG. 1D discloses the two slotted buckle utilized in the embodiment set forth in FIG. 1A (with its slots set are 90 degrees one to the other) while FIG. 1E discloses a single slot buckle utilized in yet another preferred embodiment of the invention set forth in FIG. 5.

FIG. 2 discloses a perspective view of the FIGS. 1A/1B preferred embodiment as affixed to the passenger seat of a motorcycle.

DETAILED DESCRIPTION OF THE INVENTION

Figure 3:
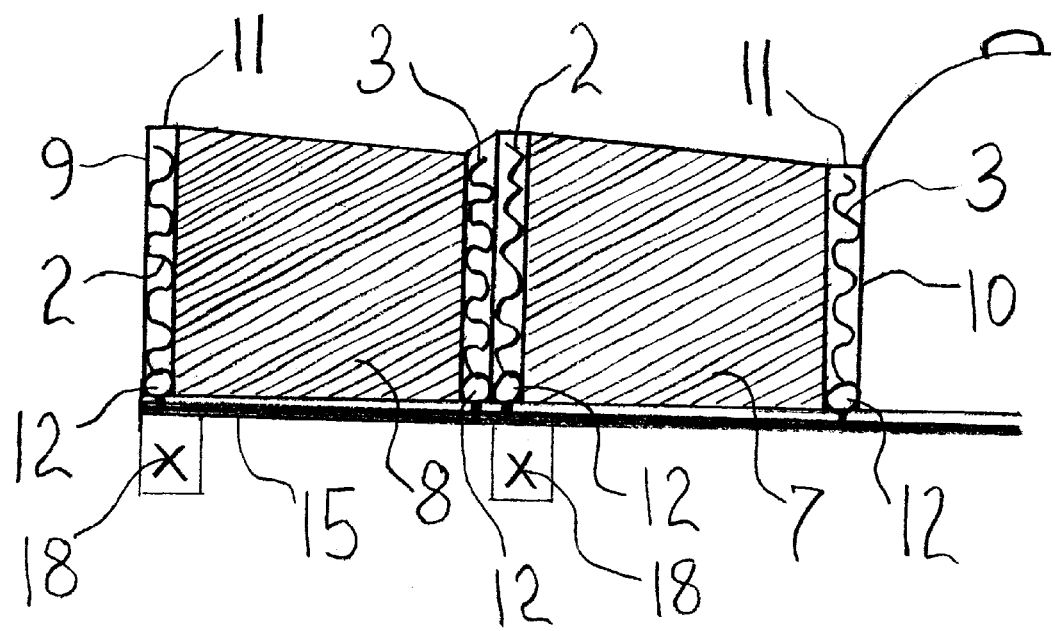
FIG. 3 shows a side/cross-sectional view of the FIG. 2 disclosure but with the belts, in the passenger and operator seats, fully retracted and covered in their compartments.

FIG. 1A, the first preferred embodiment of this invention, shows a system of belts 1 sewn as shown, complete with armholes 17, belt length adjusters 6, a double slot buckle 4B, (with slots 19A and 19B set at 90 degrees one to the other: see FIG. 1D) and a buckle tongue 5. All of these comprise the back-anchored piece 2. The back-anchored piece 2 is housed in a compartment 9 (FIGS. 2 and 3) behind the user's seat where it is rooted in a spring-loaded inertia reel/lock 12. The compartment 9 has a sliding cover 11. The inertia reel/lock 12 is itself firmly attached to the frame 15 of the open vehicle (here a motorcycle).

FIGS. 1B and 1C disclose alternate constructs of the accompaniment to the back anchored piece 2. The former shows a belt 1 with a broad base 3.1 that tapers at its end where it is attached to a buckle tongue 5. The latter shows a uniform width belt 3.2, bi-anchored anchored with a buckle tongue 5. This buckle is not fastened to any portion of the belt but is equipped with a loop at its base (not shown) through which the belt 1 runs. Either of these constructs constitute the front-anchored piece 3 (FIGS. 2–4) and each is also equipped with an inertia reel/lock 12, all housed in front of the user's seat in a compartment 10 with a sliding cover 11 (FIG. 3).

Figure 4:
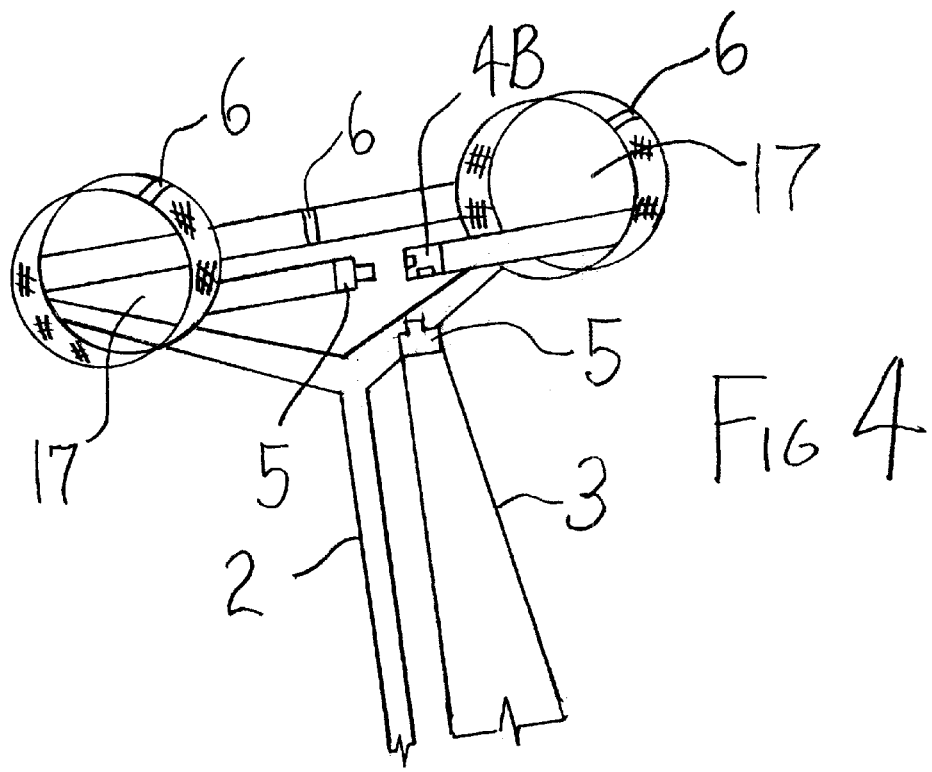
FIG. 4 is a perspective view of the FIG. 1A/1B embodiment of this invention just before complete assembly.

With particular reference to FIGS. 1–4, the open vehicle operator (or passenger) is secured as follows. The back-anchored piece 2 is extended out of its compartment 9. The user slides his arms through the armholes 17 and locks the buckle tongue 5 into its corresponding (side) slot 19A in the double slotted buckle 4B. Using the belt length adjusters 6, he makes any necessary adjustments to the size of the armholes and the fit of the belt around the torso. He then extends the front-anchored piece 3 from its compartment 10 and locks its buckle tongue 5 into its corresponding (bottom) slot 19B in the double slotted buckle 4B of the back anchored piece 2. This buckle is equipped with a quick release switch 14 that will disengage both tongues simultaneously when activated. FIG. 4 depicts a perspective (frontal) view of an invisible rider with this embodiment of the RRS put on but just before he snaps the buckle tongues in place. With the inertia reel/lock 12, the seat occupant will otherwise have freedom of movement but will be restrained from sailing off into the air in the event of a sudden stop or head on collision.

Figure 5:
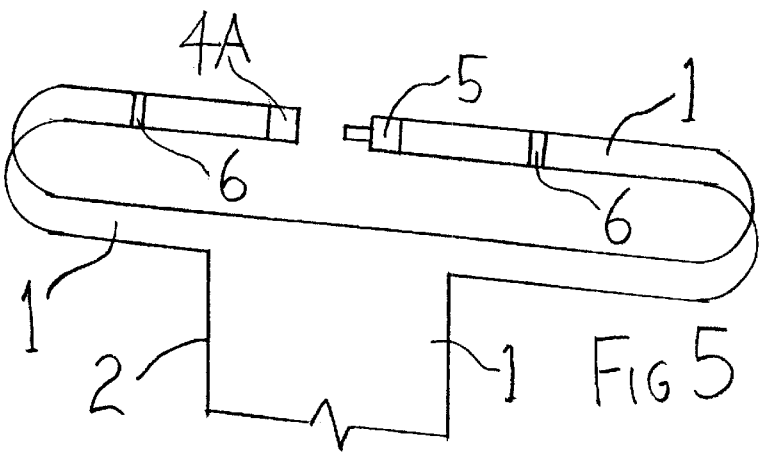
FIGS. 5, 6, and 7 disclose respectively a perspective and plan view of other preferred embodiments of this invention.

Referring more particularly to FIG. 5, there is disclosed a second preferred embodiment of this invention. There is a back-anchored piece 2 sewn with two belt arms terminating respectively in a buckle tongue 5 and a single slot buckle 4A. The anchor portion of this piece is of greater width than its arms, both of which are equipped with belt length adjusters 6. There is no front-anchored piece 3 under this embodiment.

The bike rider (or passenger) is secured by extending the back-anchored piece 2 from its compartment 9 and locking the buckle tongue 5 into the single slot 19C (see FIG. 1E) of the buckle 4A at his waist. Length adjustments for proper fit can be made with the adjusters 6. This embodiment is also equipped with an inertia reel/lock similar to that in the first preferred embodiment of this invention. Its set up and mode of operation in that respect are thus identical.

Figure 6:
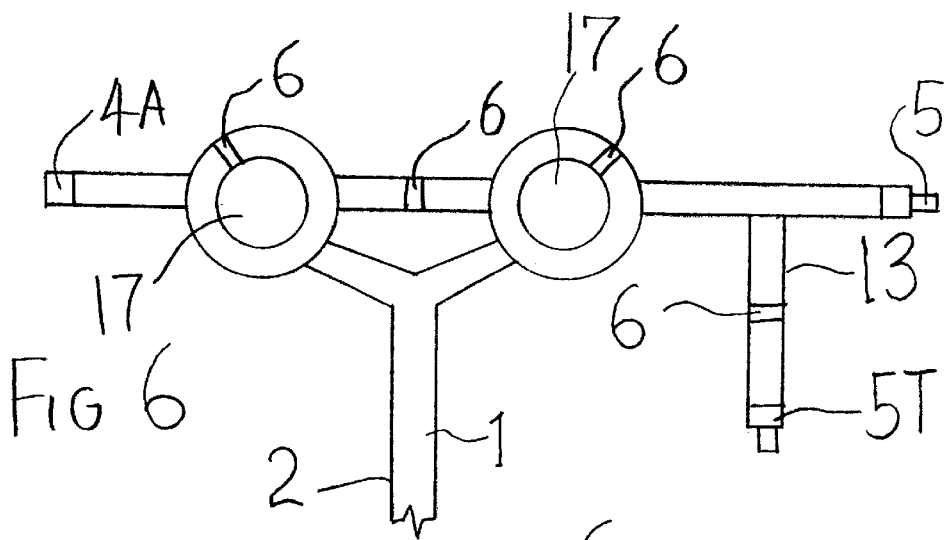
Figure 7:
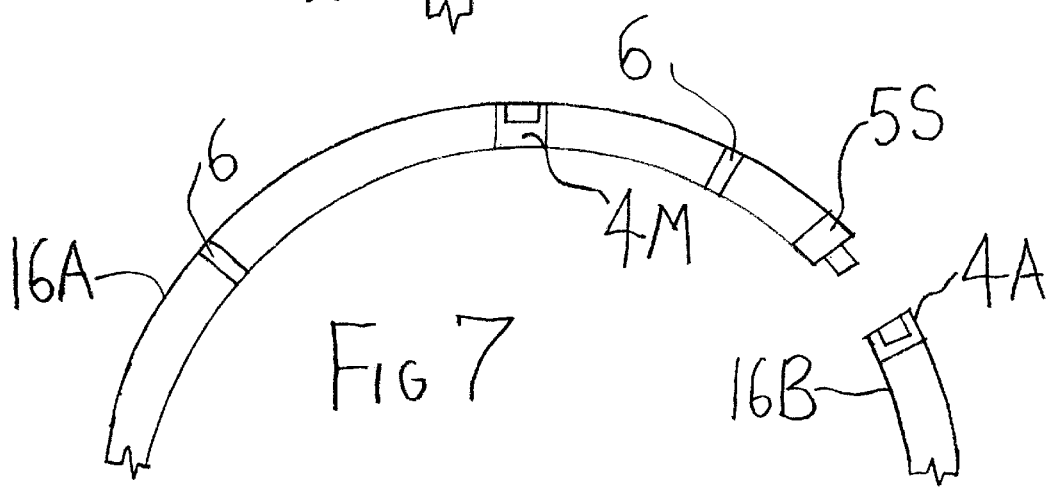

A third preferred embodiment of this invention is disclosed in FIG. 6. The back-anchored anchored piece 2 of this embodiment is similar to that set out in the first preferred embodiment but differs only in that it possesses a distinct tertiary belt arm 13, complete with a belt length adjuster 6 and a buckle tongue 5T together with a single slot buckle 4A on its primary arm instead of the double slotted buckle 4B. The tertiary arm 13 (as shown here) originates from the secondary arm that bears the buckle tongue 5. Other distinct parts of this embodiment are the side anchored piece 16A with a mid-fitted single slot buckle 4M and a buckle tongue 5S, and the side-anchored single slot buckle 16B.

The side-anchored piece 16A extends from an inertia reel/lock positioned in a side-mounted compartment (not shown), similar to the back-anchored piece compartment 9. Its belt length adjusters 6 are set such that its mid-fitted single slot buckle 4M is aligned, during use, to engage the buckle tongue 5T of the tertiary arm 13 of the back-anchored anchored piece 2 of this embodiment. Both side-anchored pieces 16A and 16B are to be mounted and affixed to the vehicle frame at opposite sides of the seat beside where the back-anchored compartment 9 would be, a position designated as 18 in FIG. 3.

The seat occupant is secured as follows. He puts on the back-anchored piece here as outlined in the first preferred embodiment set out above. He then extends the side-anchored piece 16A across his waist, engaging it with the side-anchored single slot buckle 16B. Having locked the primary and secondary arms of the back-anchored piece 2, terminating respectively in a buckle tongue 5 and a single slot buckle 4A, around his torso, the seat occupant proceeds to engage the buckle tongue 5T of the tertiary arm 13 into the mid-fitted single slot buckle 4M of the side-mounted piece 16A.

Again, as with the other preferred embodiments of this invention, the operation of the inertia reels/locks (not specifically shown for this embodiment) permit free voluntary movement of the seat occupant but guarantees restraint in the event of a sudden stop or head on collision.

Notwithstanding the illustrations and descriptions aforestated however, it is intended that the scope of this invention be no way limited. The preferred embodiments have been set forth as illustration only and any alteration, modification, combination or such like, within the spirit of the invention, are desired to be protected.

What is claimed is:

1. A restraint system for the occupant of an open vehicle such as a motorcycle comprising
    a—at least one combination of adjustable and fully retractable belts and buckles and
    b—means for preventing further extension of said belts combination in the event of involuntary movement by vehicle occupant and
    c—at least one container with closure and covering means wherein said belt and buckle combination is anchored and
    d—means for affixing said container to the frame of said open vehicle at location wherein optimum and substantial restraint on said vehicle occupant can be attained, such as behind, in front or beside vehicle seat
whereby the said belt combination is fully retracted and stored in said container with closure and covering means when not in use and on deployment operate to substantially restrain said vehicle occupant in the event of an accident and whereby said container containing said belt combination is easily affixed to new and older vehicles to secure increased safety for said vehicle occupant.

2. A restraint system according to claim 1 wherein at least one of the adjustable and fully retractable belt and buckle combinations extends from a spring loaded inertia lock within the said container with closure and covering means.

3. A restraint system according to claim 1 wherein at least one of the said containers has a sliable cover.

4. A restraint system of claim 1 wherein at least two of said containers are used wherein
    a—first container is affixed to said frame of vehicle behind said vehicle seat and containing a belt arrangement having torso and shoulder fitting portions, releaseably engaged one to the another at said vehicle occupant's frontal part and
    b—second container is affixed to frame of vehicle in front of said vehicle seat and containing a belt arrangement that releaseably engages the belt arrangement in the said first container
whereby said vehicle occupant is safely secured to said vehicle seat and prevented from being thrown off or sliding forward from said vehicle seat in the event of a head-on collision, sudden stop, or accident.

5. A restraint system of claim 1 wherein
    a—said container is affixed to said vehicle frame behind said vehicle seat and
    b—said belt combination comprises two arms to releaseably buckled around about said occupant's waist
whereby said vehicle occupant is securely held on said vehicle seat and prevented from sliding off in the event of a head-on collision, sudden stop or accident.

6. A restraint system of claim 1 wherein at least three of said containers are utilized wherein
    a—first container is affixed to said frame of vehicle behind said vehicle seat and containing a belt arrangement having torso and shoulder fitting portions, releaseably engaged one to the another at said vehicle occupant's frontal part, with one of said torso and shoulder fitting portions having an adjustable tertiary arm mounted downwards and terminating with means for releaseably engaging the belt arrangement of other containers and b—second and third containers are affixed to frame of vehicle on opposite sides of said vehicle seat and containing belt arrangements that releaseably engage one to the other substantially across and in front of said vehicle occupant's waist, with one of said belt arrangements having means for releaseably engaging the tertiary arm of belt arrangement in said first container whereby said vehicle occupant is securely held on said vehicle seat and prevented from sliding off in the event of a head-on collision, sudden stop or accident.

* * * * *